United States Patent [19]

Hiestand

[11] Patent Number: 5,040,806
[45] Date of Patent: Aug. 20, 1991

[54] CHUCKING DEVICE

[75] Inventor: Karl Hiestand, Pfullendorf, Fed. Rep. of Germany

[73] Assignee: SMW Schneider & Weisshaupt GmbH, Mechenbeuren, Fed. Rep. of Germany

[21] Appl. No.: 558,685

[22] Filed: Jul. 27, 1990

[30] Foreign Application Priority Data

Jul. 28, 1989 [DE] Fed. Rep. of Germany ....... 3925018

[51] Int. Cl.⁵ .............................................. B23B 31/02
[52] U.S. Cl. ..................................... 279/110; 279/123
[58] Field of Search ............... 279/110, 121, 123, 1 SJ

[56] References Cited

U.S. PATENT DOCUMENTS

| 3,560,010 | 2/1971 | Hohwart | 279/123 |
| 4,352,500 | 10/1982 | Blättry et al. | 279/121 |
| 4,569,530 | 2/1986 | Cross | 279/123 |
| 4,667,972 | 5/1987 | Hiestand | 279/123 |
| 4,690,416 | 9/1987 | Röhm | 279/110 |

FOREIGN PATENT DOCUMENTS

| 98348 | 1/1984 | European Pat. Off. | 279/123 |
| 3823933 | 3/1989 | Fed. Rep. of Germany | 279/123 |
| 1386608 | 3/1975 | United Kingdom | 279/123 |

Primary Examiner—William Briggs
Attorney, Agent, or Firm—Robert W. Becker & Associates

[57] ABSTRACT

A chucking device is provided that has displaceable base jaws that can be coupled with attachment jaws via respective one-piece securing bars that are axially supported and radially displaceably guided in a guide slot of the attachment jaw and an inclined guide slot of the base jaw. To effect radial shifting of the securing bars, an adjustment pin is disposed in the base jaw parallel to the guide slot thereof and is in operative connection with the securing bar via an undercut.

11 Claims, 3 Drawing Sheets

CHUCKING DEVICE

BACKGROUND OF THE INVENTION

The present invention relates to a chucking or clamping device, especially a chuck for a turning machine, vise, etc., and includes radially displaceable base jaws that are, for example, guided in a chuck body and that are connected individually or in common with an actuating member, with exchangeable attachment jaws being provided that engage teeth in end faces of the base jaws, can be coupled with associated base jaws, can be shifted axially by a distance equal to at least the height of the intermeshing jaw teeth, and in end portions that face the base jaws, are provided with guide slots that extend perpendicular to the longitudinal axis of the chuck or vise.

DE-OS 29 49 567 discloses a chuck of this general type. To couple the attachment jaws with the base jaws, this chuck is provided with respective grooved pieces that are axially displaceably disposed in a recess provided in the base jaw; a hammerhead-shaped end of the grooved piece extends into a groove provided in the attachment jaw. The axial displacement of the grooved piece by the height of the intermeshing jaw teeth is effected via a securing element that is disposed in a recess provided in the base jaw, and that is radially displaceable via a fixed threaded spindle. The displacement movements of the securing element are transmitted to the grooved pieced via inclined surfaces.

In addition to the fact that this embodiment has a complicated construction and is hence expensive to manufacture, no direct connection of the attachment jaw to the base jaw is provided. Rather, the jaws of the heretofore known device are coupled with one another via the grooved piece, the securing element, as well as the threaded spindle and consequently via a plurality of elements that can be shifted in a variety of ways, so that a high stability does not result and consequently the range of application of this known chuck is limited. Furthermore, it is not possible to exchange the jaws within a short period of time, because the rotational movement of the displacement spindle must be changed into an axial movement. Furthermore, the axial displacement path of the grooved pieces is small, so that the intermeshing teeth of the base and attachment jaws can similarly transmit no high forces. It is also possible to have only either an internal or external clamping of a workpiece.

It is therefore an object of the present invention to embody a chucking device of the aforementioned general type in such a way that a rigid connection of the attachment jaws with the base jaws is always realized, yet it is none the less possible to very easily and quickly exchange the attachment jaws via a parallel shifting. Furthermore, the structural complexity and the manufacturing costs should be kept small; in addition, it must be possible to undertake an exchange of jaws without difficulty and without having to loosen bolts. Above all, a high stability of the connection as well as a large radial displacement range of the attachment jaws should be provided, so that even extremely high clamping forces can be transmitted without difficulty to a workpiece that is secured between the attachment jaws. Furthermore, both internal and external clamping of a workpiece should be readily possible.

BRIEF DESCRIPTION OF THE DRAWINGS

These and other objects and advantages of the present invention will appear more clearly from the following specification in conjunction with the accompanying schematic drawings, in which.

SUMMARY OF THE INVENTION

Figure 1:
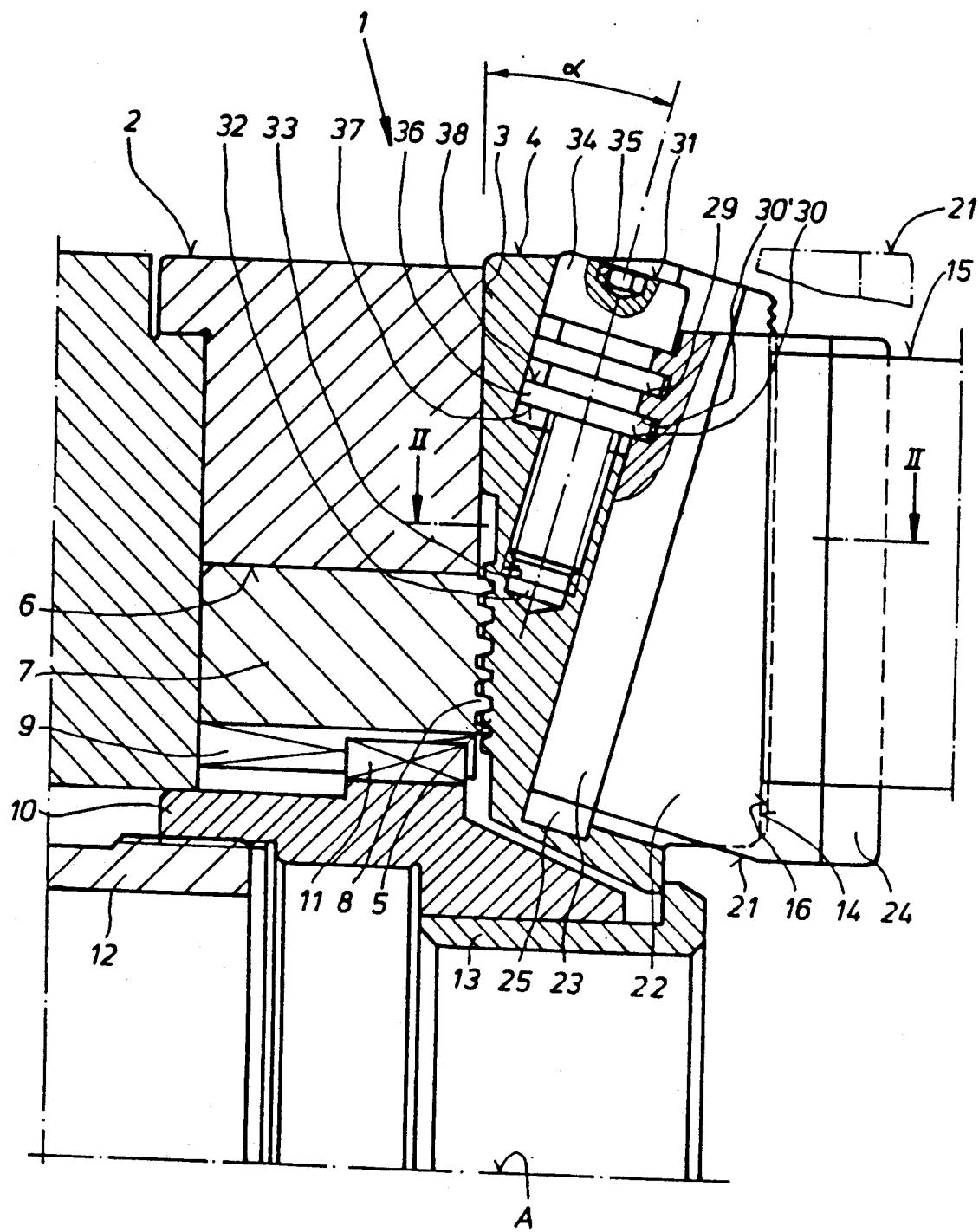
FIG. 1 is an axial cross-sectional view through one exemplary embodiment of the inventive chucking device, which is shown as a chuck for a turning machine, and is provided with exchangeable attachment jaws.

The chucking device of the present invention is characterized primarily in that: to effect the coupling of the attachment jaws with the base jaws, respective one-piece securing bars are provided, each of which is axially supported, via undercut surface means, in the guide slot of the attachment jaw and in a guide slot that is provided in the base jaw and is disposed at an angle to the longitudinal axis of the chuck or vise, with each securing bar being radially shiftable in the guide slots; and to effect radial shifting of the securing bars, respective adjustment pins are provided, each of which is disposed in a base jaw parallel to the inclined guide slot thereof, with the adjustment pins being in operative connection with the securing bars via one or more further undercut means.

It is expedient for the guide slots of the base jaws and the attachment jaws to have a T-shaped cross-sectional configuration, with the undercut means thereof being formed by contact surfaces that extend perpendicular or at an angle to the center, and for the securing bars to have a double-T-shaped cross-sectional configuration that complements the cross-sectional configurations of the guide slots.

The adjustment pin can easily be displaceably held in a bore that is provided in the base jaw and has an internal thread, whereby to actuate the adjustment pin, in the radially outwardly directed end face or head thereof a key or wrench hole or some other actuation profile for a screw or wrench tool should be provided.

The undercut means of the adjustment pin can advantageously be formed by one or more collars or a head that in the axial direction are disposed one after the other and have contact surfaces that project therefrom in a direction perpendicular to a central axis of the adjustment pin; these collars or head extend into complementary notches provided in the securing bar. However, it is also possible to form these undercut means by one or more annular grooves that are formed in the adjustment pin and are provided with contact surfaces that extend perpendicular to the longitudinal axis thereof, with these annular grooves being engaged by complementary projections that extend from the securing bar.

Both the guide slot for the securing bar that is formed in the base jaw as well as the longitudinal axis of the adjustment pin, should extend parallel to one another and should each extend at an angle of preferably 10° to 20° relative to a perpendicular to the longitudinal axis of the chuck and in a direction toward the attachment jaws.

In order to achieve a high rigidity or stability of the connection, the length of the securing bar should be such that it is at least two thirds of the height of the base jaw.

It is furthermore suitable, in order to monitor the displacement movement of the adjustment pin and/or of the securing bar, to associate with each of these components a respective proximity switch or the like that is actuatable either directly or via intermediate elements by the adjustment pin and/or the securing bar in the end position thereof.

By means of a chucking device that is constructed pursuant to the present invention, it is possible not only to rapidly couple or loosen the connection of the attachment jaws, for example of a chuck for a turning machine, with the base jaws, but also an extremely high stability of the base jaw/attachment jaw unit results, so that very high clamping forces can be transmitted without difficulty. This is so because the base and attachment jaws are not bowed due to high localized stresses where the coupling of the attachment jaws with the base jaws is inventively provided via a securing bar that is radially shiftable in guide slots via an adjustment pin, and that engages directly in the jaws that are to be interconnected and via which, as a consequence of a radial displacement, an axially directed shifting of the attachment jaws is also realized: instead of causing a bowing, the forces that occur bear against a large surface area, so that a rigid connection results. Furthermore, the inventively proposed coupling enables a great axial shiftability of the attachment jaws, so that the intermeshing teeth, over the height of which the attachment jaws must by axially shiftable in order to permit exchange thereof, can thus also be designed to transmit high clamping forces.

Since as a result of the adjustment pin the securing bar can be actuated directly, the connection between the attachment jaws and the base jaws can also be released or established in a short period of time. A further advantage is that the attachment jaws, especially since no mounting screws are disposed therein, can be nearly completely taken advantage of and hence bored out, and the individual components are easy and economical to produce since they need be provided with only straight-surfaced guide slots or recesses. Furthermore, the inventively proposed chucking device can advantageously be used to not only internally clamp a workpiece but also to externally clamp a workpiece.

Further specific features of the present invention will be described in detail subsequently.

DESCRIPTION OF PREFERRED EMBODIMENTS

Figure 3:
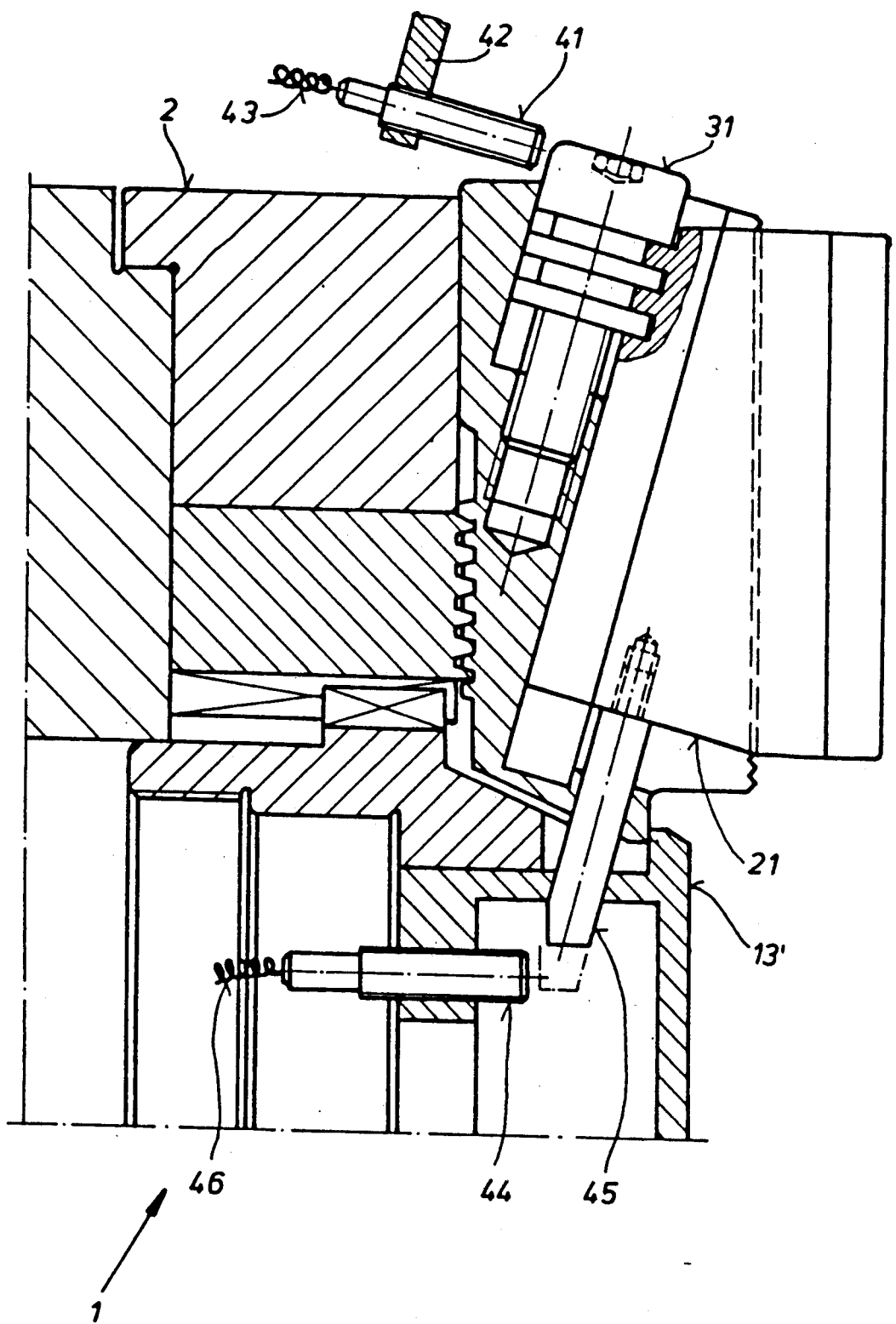
FIG. 3 is a cross-sectional view similar to that of FIG. 1 with the chuck being additionally provided with monitoring elements.

Referring now to the drawings in detail, the chuck 1 illustrated in FIGS. 1 and 3 essentially comprises a two-part chuck body 2, in radially directed slots 3 of which are displaceably disposed base jaws 4 that can be operated via key members 7 that are disposed in recesses 6 and are embodied as actuating elements; the chuck also comprises contact or attachment jaws 15 that are exchangably coupled with the base jaws 4. To shift the key members 7, a common control member 10 is provided that acts via wedge or key surfaces 11 upon wedge or key surfaces 9 provided on the key members 7. Via the interposition of an axially displaceable working shaft 12 that is screwed in, the control member 10 can be shifted by a non-illustrated servo mechanism that is connected to the working shaft 12. By axially shifting the control member 10, the key members 7 are shifted in a peripheral direction and thereby shift the base jaws 4 either radially inwardly or radially outwardly via teeth 5 that mesh with teeth 8 provided on the key members 7. The slots 3 provided in the chuck body 2 are covered toward the inside by a sleeve or liner 13.

The attachment jaws 15 are coupled with the base jaws 4 via respective securing bars 21 that are radially shiftably disposed and held in a guide slot 25 that is provided in the base jaws and extends at an angle α of, for example, 15° relative to a perpendicular to the longitudinal axis A of the chuck 1 and also extends at an angle in the direction toward the attachment jaws 15; the securing bar 21 is also radially shiftably disposed and held in a guide slot 27 that is provided in the attachment jaws 15 perpendicular to the longitudinal axis A. The guide slots 25 and 27 are provided with undercuts that are formed by abutment surfaces 26 and 28 respectively that extend perpendicular to the center, and the securing bar 21 has a complementary double-T-shaped cross-sectional configuration. Thus, the cross members 23 and 24 of the securing bar 21, which project from the central stem 22, are supported in the guide slots 25 and 27 along large surfaces. It is to be understood that the undercuts could also be formed by abutment surfaces 28' that extend at an angle, as indicated by the dot-dash lines in FIG. 2.

Radial displacement of the securing bar 21 is effected via an adjustment pin 31, which is disposed in a bore 32 that is provided in the base jaw 4, extends parallel to the guide slot 25 thereof, and is provided with an internal thread 33. Provided in the head 34 of the adjustment pin 31 is a key or wrench hole 35. In addition, a plurality of collars 36 that in an axial direction are disposed one after the other are provided on the adjustment pin 31; these collars 36 are provided with contact surfaces 37 and 38 that extend perpendicular to a central axis. The securing bar 21 is provided with correspondingly shaped notches 29 that have support surfaces 30 and 30' that extend at an angle to the longitudinal axis A of the chuck 1 and against which the contact surfaces 37 and 38 of the adjustment pin 31 rest.

Figure 2:
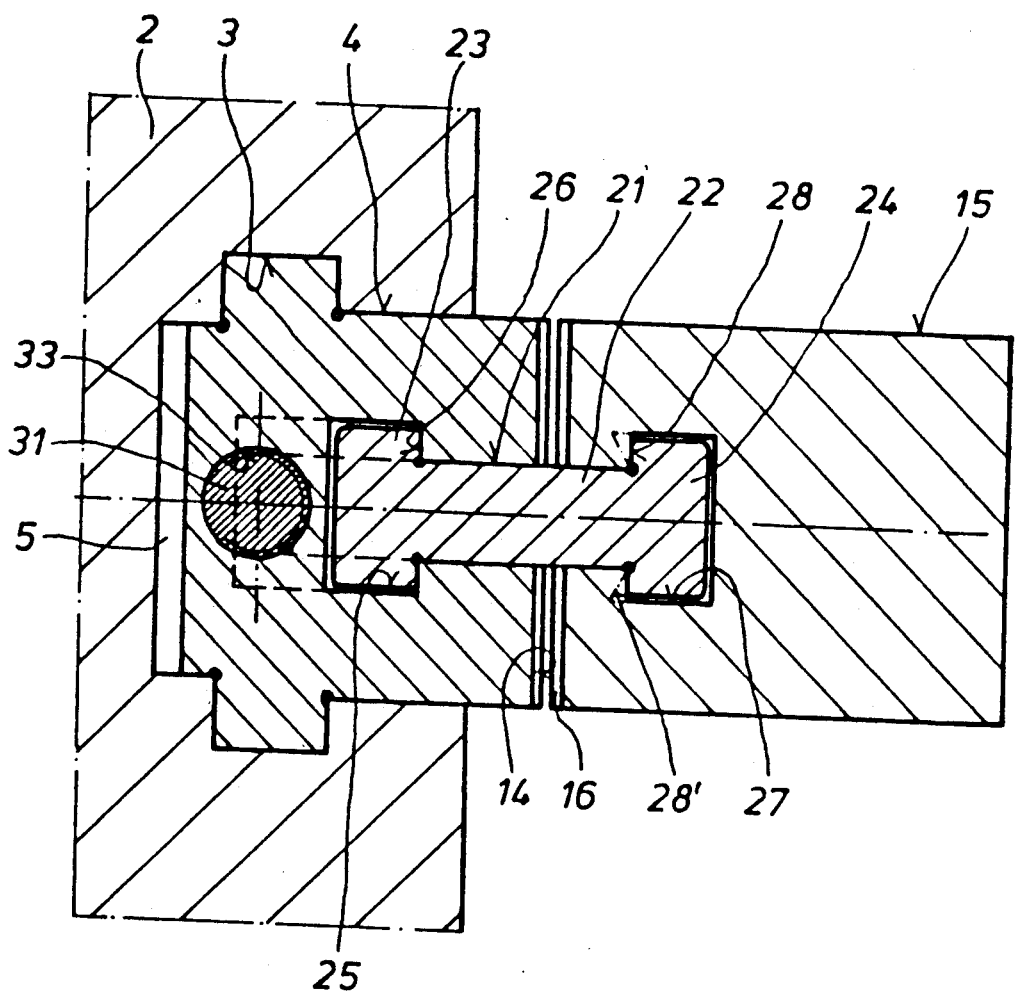
FIG. 2 is a cross-sectional view taken along the line II—II in FIG. 1 during an exchange process.

If in the operating position of the chuck 1 illustrated in FIG. 1 the adjustment pin 31 is turned by a tool that is to be placed into the wrench hole 35 thereof in such a way that the adjustment pin 31 is displaced outwardly, then due to the fact that the contact surfaces 38 of the pin 31 act upon the support surfaces 30' of the securing bar 21, the securing bar is taken along by the adjustment pin 31 and is hence also displaced radially outwardly. In addition, since the guide slot 25 that is provided in the base jaw 4 is inclined at the angle α, the securing bar 21 is also shifted toward the right in the direction of the longitudinal axis A of the chuck 1. If an axial displacement over a given distance is achieved (this operating state is illustrated in FIG. 2) that corresponds at least to the height of the intermeshing teeth 14 and 16 that are provided on the facing sides of the base jaw 4 and the attachment jaw 15, the attachment jaw 15 can be radially shifted inwardly or outwardly on the securing bar 21, and can hence be removed therefrom. After a different attachment jaw has been placed upon the cross member 24 of the securing bar 21, and the adjustment pin 31 has been tightened (in so doing the securing bar 21 is carried along due to the fact that the contact surfaces 37 of the collars 36 act upon the support surfaces 30), a fixed connection is again established between the base jaws 4 and the attachment jaws 15.

As shown in FIG. 3, proximity switches 41 and 44 can be associated with the adjustment pin 31 and/or the securing bar 21 in order to be able to monitor the end positions. In this way, a premature start-up of the shop machine that carries the chuck 1 is reliably precluded.

In this connection, the proximity switch 41, which is disposed in a fixed bracket 42 and is connected via a signal line 43 with the control mechanism of the machine, can be influenced directly by the adjustment pin 31 as soon as this pin is unscrewed. In contrast, to actuate the proximity switch 44, which is similarly connected via a signal line 46 to the control mechanism of the machine, a signal emitter 45 is mounted on the securing bar 21; this signal emitter extends through the sleeve 13' and cooperates with the proximity switch 44 that is disposed in this sleeve.

The present invention is, of course, in no way restricted to the specific disclosure of the specification and drawings, but also encompasses any modifications within the scope of the appended claims.

What I claim is:

1. In a chucking device, including radially displaceable base jaws that are in connection with an actuating member, with exchangeable attachment jaws being provided that engage teeth in end faces of said base jaws, can be coupled with associated base jaws, can be shifted axially by a distance equal to at least the height of the intermeshing jaw teeth, and in end portions that face said base jaws, are provided with first guide slots that extend perpendicular to the longitudinal axis of said device, the improvement wherein:

to effect said coupling and adjustable positioning of each of said attachment jaws to said base jaws, respective one-piece securing bars are provided, each of which is axially supported, via first undercut surface means, in said first guide slot of said attachment jaw and in an inclined second guide slot that is provided in said base jaw and is disposed at an incline to said longitudinal axis of said device, with each of said securing bars being radially shiftable in said first and second guide slots; and to effect radial shifting and adjustment to selected positions of each of said securing bars, respective adjustment pins are provided, each of which is disposed in a base jaw parallel to said inclined second guide slot thereof, with said adjustment pin being in operative connection with said securing bar via at least one further undercut means.

2. In a chucking device, including radially displaceable base jaws that are in connection with an actuating member, with exchangeable attachment jaws being provided that engage teeth in end faces of said base jaws, can be coupled with associated base jaws, can be shifted axially by a distance equal to at least the height of the intermeshing jaw teeth, and in end portions that face said base jaws, are provided with first guide slots that extend perpendicular to the longitudinal axis of said device, the improvement wherein:

to effect said coupling of each of said attachment jaws to said base jaws, respective one-piece securing bars are provided, each of which is axially supported, via first undercut surface means, in said first guide slot of said attachment jaw and in a second guide slot that is provided in said base jaw and is disposed at an incline to said longitudinal axis of said device, with each of said securing bars being radially shiftable in said first and second guide slots; and to effect radial shifting of each of said securing bars, respective adjustment pins are provided, each of which is disposed in a base jaw parallel to said inclined second guide slot thereof, with said adjustment pin being in operative connection with said securing bar via at lest one further undercut means, whereby each of said adjustment pins is displaceably held in a bore that is provided in said base jaw and has an internal thread.

3. A chucking device according to claim 2, in which said first and second guide slots of said base jaws and said attachment jaws have a T-shaped cross-sectional configuration with support surfaces that are disposed perpendicular or at an angle to a central axis and form said first undercut surface means, with said securing bar having a double-T-shaped cross-sectional configuration that is complementary to said cross-sectional configuration of said first and second guide slots.

4. A chucking device according to claim 2, in which said adjustment pin, for actuation thereof, is provided in a radially outwardly directed end face thereof with a tool-receiving profile.

5. A chucking device according to claim 2, in which said adjustment pin is embodied as a bolt with a head.

6. A chucking device according to claim 2, in which said further undercut means comprise: collar means that in an axial direction of said adjustment pin are disposed one after the other, project therefrom, and are provided with contact surfaces that extend perpendicular to a central axis of said adjustment pin: and complementary to said collar means, notches provided in said securing bar for receiving same.

7. A chucking device according to claim 2, in which said further undercut means for said adjustment pin comprise at least one annular groove that is provided in said adjustment pin and has support surfaces that extend perpendicular to a central axis thereof; and, complementary to said at least one annular groove, projections that extend from said securing bar.

8. A chucking device according to claim 2, in which said second guide slot of said base jaw, and a central longitudinal axis of said adjustment pin, extend parallel to one another as well as at an angle to a perpendicular to said longitudinal axis of said device and in a direction toward said attachment jaw.

9. A chucking device according to claim 8, in which said angle is from 10° to 20°.

10. A chucking device according to claim 2, in which said securing bar has a length that is at least two thirds the height of said base jaw.

11. A chucking device according to claim 2, in which to monitor displacement movements of at least one of said adjustment pin and said securing bar, respective proximity switch means are associated therewith and in end positions thereof are actuatable thereby.

* * * * *